United States Patent
Langsdorf et al.

(10) Patent No.: US 6,802,189 B2
(45) Date of Patent: Oct. 12, 2004

(54) DEVICE AND PROCESS FOR THE REMELTING OF GLASS

(75) Inventors: Andreas Langsdorf, Frankfurt am Main (DE); Hildegard Römer, Karben (DE); Paul Kissl, Mainz (DE)

(73) Assignee: Schott Glas, Mainz (DE)

( * ) Notice: Subject to any disclaimer, the term of this patent is extended or adjusted under 35 U.S.C. 154(b) by 239 days.

(21) Appl. No.: 09/748,974

(22) Filed: Dec. 27, 2000

(65) Prior Publication Data

US 2001/0017043 A1 Aug. 30, 2001

(30) Foreign Application Priority Data

Dec. 30, 1999 (DE) .......................................... 199 63 867

(51) Int. Cl.[7] .............................................. C03B 19/10
(52) U.S. Cl. ........................... 65/21.2; 65/29.18; 65/74; 65/126; 65/129; 65/142; 65/268; 65/325; 65/407
(58) Field of Search ................................ 65/21.1, 21.2, 65/63, 64, 75, 126, 129, 142, 268, 325, 324, 29.18, 412, 407

(56) References Cited

U.S. PATENT DOCUMENTS

| | | | | |
|---|---|---|---|---|
| 1,128,175 A | * | 2/1915 | Morf ........................... 65/21.2 |
| 2,286,653 A | | 6/1942 | Siegfried ........................ 49/53 |
| 3,049,754 A | | 8/1962 | Frickert ............................ 18/8 |
| 3,055,050 A | | 9/1962 | Schuller et al. ................... 18/8 |
| 3,055,051 A | | 9/1962 | Schuller ............................ 18/8 |
| 4,145,200 A | * | 3/1979 | Yamazaki et al. ............. 65/405 |
| 4,372,771 A | * | 2/1983 | Coucoulas et al. .............. 65/75 |
| 4,643,750 A | | 2/1987 | Glaser ............................... 65/2 |
| 6,098,429 A | * | 8/2000 | Mazabraud et al. ........... 65/407 |

FOREIGN PATENT DOCUMENTS

| | | |
|---|---|---|
| BE | 433 055 | 3/1939 |
| BE | 489119 | 11/1949 |
| FR | 2.208.547 | 9/1959 |
| JP | 63-236729 | 10/1998 |
| WO | WO 96/38392 | 12/1996 |

OTHER PUBLICATIONS

Office Action in German Application No. 199 63 867.5 and English Language translation of same.

* cited by examiner

*Primary Examiner*—Sean Vincent
(74) *Attorney, Agent, or Firm*—Baker & Daniels

(57) ABSTRACT

A process for the remelting of glass bars, including the steps of introducing a glass bar into an upper end of a receiving shell; providing a molten bath having a surface underneath the receiving-shell; positioning the receiving shell such that a lower edge of the receiving shell is located at the height of the surface or above it; heating a lower end of the glass bar to a temperature above a softening temperature of the glass, resulting in a melt-off process at the lower end of the glass bar to produce a melt stream; controlling the melt-off process such that the melt stream continuously enters the molten bath proximate the surface with avoidance of a constriction; and drawing off melt from the molten bath by means of an arrangement for drop generation.

4 Claims, 1 Drawing Sheet

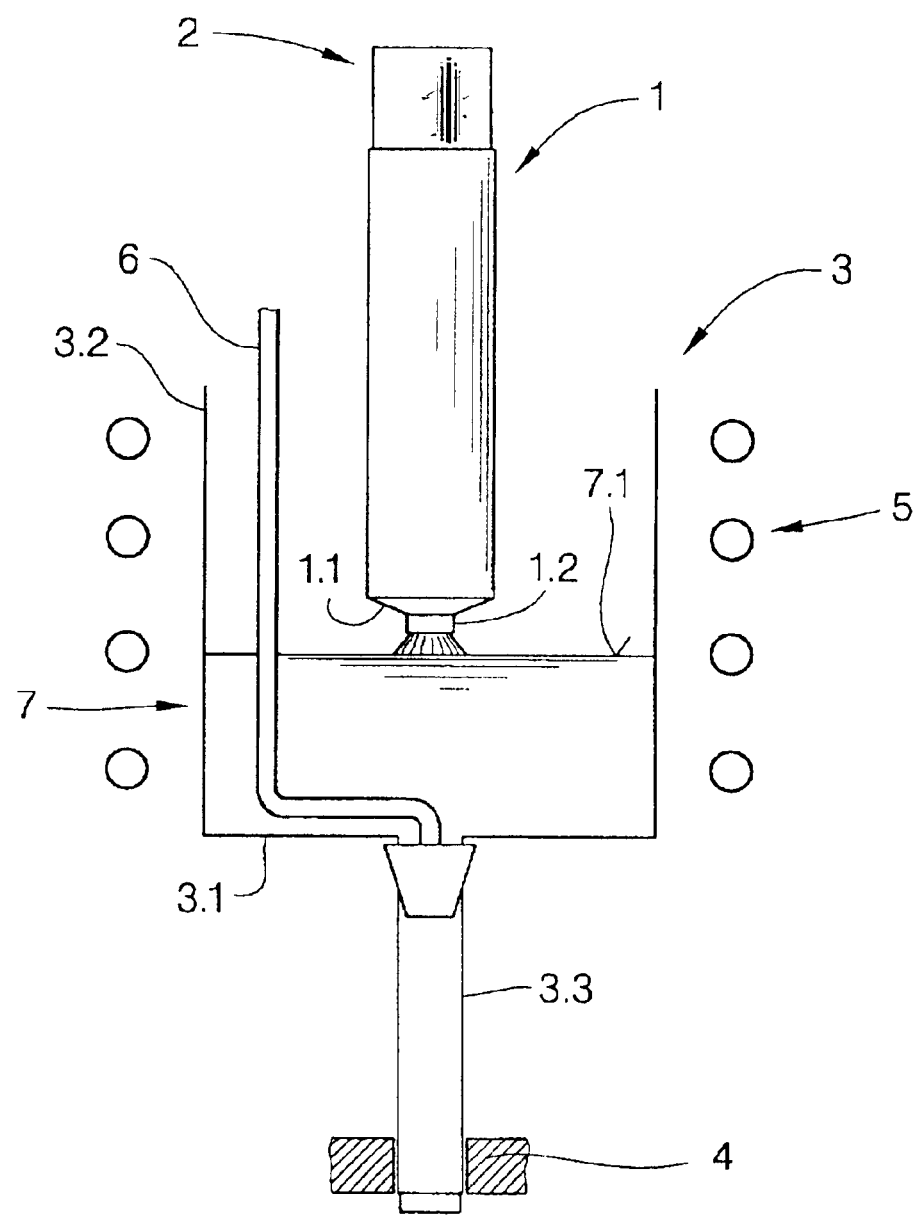

DEVICE AND PROCESS FOR THE REMELTING OF GLASS

The invention relates to a device and to a process for the remelting of glass semifinished products. It is a matter here of glass semifinished products that are present in the form of bars. The bars have mostly a circular cross section. The remelting of such glass semifinished products is necessary for the further processing. It is associated mostly with a portioning of glass.

In principle glass—either pre-portioned or in relatively large quantities—can be melted with the necessity of a subsequent portioning.

The process of the remelting of portioned glass is problematical. From a certain temperature onward, namely, there occurs an adhesion of the glass to the underlayer or, respectively, to the forming tool. The so-called adhesion temperature ($10^{10}$ dPas) lies below the softening temperature ($10^{7.6}$ dPas), so that in the remelting there occurs an adhesion of the glass to the wall of the melting vessel.

There could be considered cooling the wall, so that in the wall zone the adhesion temperature is not reached. But in the heating-up process the cooling cannot be strong enough for the contact temperature to remain below the adhesion temperature. Furthermore, there occur excessively great inhomogeneities of the temperature.

As remedy, work is being done with separating agents of various type. These lead, however, to undesired alterations of the glass surface.

The other possibility lies then in melting larger quantities and then portioning them. There the glass semifinished product is usually prepared not in the form of regular bodies, but it can be melted-up in the crucible as glass fragments. In the first place, however, this process is in general a discontinuous one; continuous processes require special measures and therewith special expenditures. In the second place, here in all cases hollow-space forms, which are filled with air or another gas. To the glass fragments adsorbed gas adheres. When the fragment surfaces pass into the melt, then the adsorbed gas is released from the fragment surfaces, and bubbles form. In order to remove these bubbles again from the melt, a strong increase of the melt temperature to refining temperature is necessary. This means that the melting processes must be run through once again. This is highly unfavorable and uneconomical energy-wise.

It is also possible, when using glass bars, to heat up the free bar end and therewith to do the melting. There, to be sure, the above-mentioned problems do not arise. Here, however, there occurs a continuous run-off of the glass in the form of a downward-tapering glass stream. A dropportioning is not possible.

JP 63/236729A shows a device with which a glass fiber is drawn. At the outlet of a revolving nozzle there arises a "draw onion" (Ziehzwiebel). This device, therefore, does not serve for the remelting and portioning of glass bars.

Underlying the invention is the problem of providing steps with which a remelting and portioning of glass semifinished material is possible without there arising the problems of adhesion, of alteration of the glass surface, or of the gas inclusion; further, an energy-wise and economically favorable process is to be given, with which semifinished material can be rewarmed and made available for the shaping.

This problem is solved by the independent claims. The solution is very simple and requires a relatively slight expenditure.

One proceeds, accordingly, from a receiving shell which has an upper receiving opening for the introduction of a glass bar, and a lower outlet opening. To the shell there is assigned a crucible. The crucible is open at the top, so that the shell can plunge, at least in a part of its length, into the space enclosed by the crucible wall. The crucible has a runoff in its lower region. There, any type of crucible heating is possible, for example a resistance heating and a radiation heating. An advantageous form of execution is the providing of a coil which surrounds the wall of the crucible in a known manner. The coil serves for the coupling of electric energy into the crucible contents.

The shell is suitably designed and dimensioned in such manner that its inner contour corresponds to the outer contour of the glass bars to be processed. The shell does not absolutely have to be vertical. It can also be slanted with respect to the vertical. Furthermore, instead of one shell there can also be provided several shells.

By corresponding allocation of shell and crucible it is achieved that the glass bar in the shell melts at its lower end. In the crucible itself there was previously melted up a glass bath. The glass bar melts off slowly at its lower end. The melting-off and flowing-off material passes continuously into the bath mentioned, present in the crucible.

When energy costs play no role, then the semi-finished products can simply be melted up again below, refined at low viscosities and then fed to the shaping operation. This heating to melting or refining temperature can be eliminated by the invention. The advantage becomes clear if one considers that the refining temperature can lie at approximately 1600° C., for the shaping, however, only temperatures on the order of 1100° C. are necessary.

What is essential for the device in its general form is merely that the receiving shell be arranged over a container that contains a glass melt. The glass melt is portioned—possibly only after further transport. Also an intermediately engaged homogenization step is conceivable. This becomes necessary if the introduced glass is a glass other than that which is present in the container.

An essential advantage of the process of the invention for the remelting and portioning is the continuity through the steady following-up of the glass bars. There the shape of the glass bar ends to be added to one another is decisive in respect to the avoiding or minimizing of bubble inclusions.

Untreated bar ends, by reason of shrinkage in the production, have a concave curvature. The setting on one another of two such ends would lead to a gas inclusion in the cavity arising between the ends, which would later become visible in the feeder as bubble thrust, therefore spoilage.

A bar end is easily influenceable by the casting mold used for the production. The shaping of the (other) bar end must occur by mechanical reworking and is expensive. But at least it is possible, if necessary, to free it from the concave curvature in this way. As suitable pairs of bar ends there have proved the combinations in which the gas to be expelled can escape and is not trapped.

If the same amount of melt that is removed in a portioned manner is added to the crucible, then the volume of the melt in the crucible remains constant. The level of the melt, therefore, likewise remains constant. If these conditions are maintained, then no level re-setting of the receiving shell is necessary.

For reasons of energy saving the volume of the crucible should be just as great as that of the required portions being processed. Any increase of this volume is unfavorable in respect to the energy saving of the process.

The invention is explained in detail with the aid of the drawing. The drawing shows in vertical section an arrangement for the remelting of glass bars.

There is perceived in particular the following:

A receiving shell 1 is provided. This is vertically arranged in the present case. It is open at the top for the reception of a glass bar 2. At its lower end it is first tapered into a truncated conical part 1.1 and then goes over into a cylindrical part 1.2.

A crucible 3 is further provided. The crucible is pot-shaped. It has a bottom 3.1 as well as a cylindrical wall 3.2. The crucible has in its bottom a runoff in the form of a runoff shell 3.3. To the runoff shell 3 there is assigned a heating arrangement 4.

The cylindrical wall 3.2 of the crucible 3 is surrounded by a medium frequency coil 5. Over this coil electric medium-frequency energy is coupled into the crucible contents. Through the warmed crucible wall and the warmed glass bath the receiving shell 1 is warmed by heat radiation over the crucible wall and the glass bath, especially its lower region.

The receiving shell 1 is produced in the present case from platinum with a wall thickness of 1 mm. The receiving shell is adjustable in its height. The melt-off amount is regulated over the height adjustment of the receiving shell 1.

The device of the invention operates as follows:

Into the receiving shell 1 there is introduced a glass bar 2. The inner contour of the receiving shell 1 and the outer contour of the glass bar are such that the glass bar 2 is snugly enclosed by the receiving shell 1. The temperature generated by the coil 5 in the crucible 3 is controlled in such manner that the glass bar 2 melts at its lower end and supplies the melt bath 7 setting in a controlled manner with after-flowing glass. There the lower end of the receiving shell, especially the zone of the truncated conical part 1.1 and of the cylindrical part 1.2 is heated by the radiant heat from the wall 3.2 of the crucible 3 as well as by the liquid level surface 7.1 of the melt bath. Also the receiving shell 1 can be adjusted in its height. The under edge of the receiving shell will have, as a rule, a distance of 1 to 2 cm from the surface 7.1 of the melt bath. Even a plunging of the cylindrical part 1.2 into the melt bath 7 is thinkable. In accordance with the distance, the melt-off performance and therewith the throughput can be varied.

The glass bar 2 sinks by its own weight deeper and deeper into the receiving shell 1, until it is largely melted up. Before it is completely melted up, a following glass bar can be introduced from above into the receiving shell 1. The glass melt can thereby continuously be provided with glass. The runoff shell 3.3 of the crucible may be equipped with a needle feeder arrangement. Therewith it is possible to control the glass throughput throughout the device in a desired manner. The runoff shell 3.3 may also be provided with a shearing device in order to generate glass drops for the following production steps.

The device can be used everywhere where, for a following hot-shaping process there is needed glass which must be brought to high temperatures lying above the adhesion temperature. With the device there are avoided all the problems of the state of the art. There does not occur any adhesion of glass to the walls of a shaping arrangement. No separating agent is needed. The glass surface is subject to no alteration. No after-engaged refining process is needed.

The device represented comprises a needle feeder 6.

The crucible represented in the present case is a platinum crucible. The induction heating has a power of 10 kHz. Instead of this there would also be conceivable a 50 Hz resistance heating or a radiation heating.

What is claimed is:

1. Process for the remelting of glass bars, comprising the following steps:

introducing a glass bar into an upper end of a receiving shell;

providing a molten bath having a surface underneath the receiving shell;

positioning the receiving shell such that a lower edge of the receiving edge is located at the height of the surface or above it;

heating a lower end of the glass bar to a temperature above a softening temperature of the glass, resulting in a melt-off process at the lower end of the glass bar to produce a melt stream;

controlling the melt-off process such that the melt stream continuously enters the molten bath proximate the surface with avoidance of a constriction; and drawing off melt from the molten bath by means of an arrangement for drop generation.

2. Process according to claim 1, further comprising a crucible unit in which the receiving shell is disposed, characterized in that the melt-off process of the glass bar is performed by one of coupling of electric energy into the crucible unit, radiation heating elements, and burner heating.

3. Process according to claim 1, characterized in that the amount of the glass melt-off is controlled by altering at least one of the following parameters:

adjusting the amount of energy supplied to the heating of the molten bath;

varying the spacing between the lower edge of the receiving shell and the liquid surface of the molten bath; and choking of the glass stream emerging from the bath.

4. Process according to one of claim 1, characterized in that each of the glass bars includes and end surface shaped as one of a convex form and a flat surface, in order to avoid an inclusion of gas in between the end surfaces of adjacent glass bars.

* * * * *

UNITED STATES PATENT AND TRADEMARK OFFICE
CERTIFICATE OF CORRECTION

PATENT NO. : 6,802,189 B2
DATED : October 12, 2004
INVENTOR(S) : Andreas Langsdorf et al.

It is certified that error appears in the above-identified patent and that said Letters Patent is hereby corrected as shown below:

<u>Column 4,</u>
Line 22, after "receiving" delete "edge" and insert -- shell --.

Signed and Sealed this

Eighteenth Day of January, 2005

JON W. DUDAS
*Director of the United States Patent and Trademark Office*